United States Patent
Ueda

(10) Patent No.: US 9,419,512 B2
(45) Date of Patent: Aug. 16, 2016

(54) ELECTRIC POWER CONVERTER TO REDUCE OR ELIMINATE ERRONEOUS POWER MODULE ABNORMALITY INDICATION

(71) Applicant: JTEKT Corporation, Osaka-shi (JP)

(72) Inventor: Yusuke Ueda, Tondabayashi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/485,888

(22) Filed: Sep. 15, 2014

(65) Prior Publication Data
US 2015/0085539 A1    Mar. 26, 2015

(30) Foreign Application Priority Data
Sep. 26, 2013   (JP) ................. 2013-200348

(51) Int. Cl.
| | |
|---|---|
| *H02M 1/32* | (2007.01) |
| *H02M 7/44* | (2006.01) |
| *H02P 29/00* | (2016.01) |

(Continued)

(52) U.S. Cl.
CPC . *H02M 1/32* (2013.01); *H02H 5/04* (2013.01); *H02H 7/122* (2013.01); *H02M 1/38* (2013.01); *H02M 7/44* (2013.01); *H02P 29/0088* (2013.01); *H02M 2001/327* (2013.01)

(58) Field of Classification Search
CPC ........... H02M 1/32; H02M 1/36; H02M 1/38; H02M 2001/327; H02M 7/53873; H02M 7/53875
USPC ........... 363/56.01, 56.02, 56.03, 56.04, 56.05
See application file for complete search history.

(56) References Cited

U.S. PATENT DOCUMENTS

| | | | |
|---|---|---|---|
| 5,675,482 A | 10/1997 | Suzuki et al. | |
| 6,934,139 B2 * | 8/2005 | Kumagai | H02M 1/32 361/93.1 |

(Continued)

FOREIGN PATENT DOCUMENTS

| | | |
|---|---|---|
| DE | 10 2006 057 931 A1 | 6/2008 |
| EP | 1 933 439 A1 | 6/2008 |
| JP | 7-274485 | 10/1995 |

OTHER PUBLICATIONS

Extended Search Report issued Apr. 29, 2015 in European Patent Application No. 14185755.7.

(Continued)

*Primary Examiner* — Adolf Berhane
*Assistant Examiner* — Jye-June Lee
(74) *Attorney, Agent, or Firm* — Oblon, McClelland, Maier & Neustadt, L.L.P

(57) ABSTRACT

A processor unit in an electric power converter executes detection of an overheating predicted state that is a stage prior to overheating of the IGBTs, a short circuit predicted state that is a stage prior to a short circuit in the arms, and a voltage drop predicted state that is a stage prior to a drop in a control voltage to be supplied to a driver circuit. When none of these predicted states is detected, a determination that an abnormality is not caused in the power module based on a latch signal is made by the processor unit. When an overheating predicted state is detected, the processor unit lowers the duty ratio of a motor control signal. When a short circuit predicted state is detected, the processor unit prolongs the dead time in which the upper IGBTs and the lower IGBTs are both maintained in the off-state.

10 Claims, 4 Drawing Sheets

(51) Int. Cl.
  *H02M 1/38* (2007.01)
  *H02H 7/122* (2006.01)
  *H02H 5/04* (2006.01)

(56) References Cited

U.S. PATENT DOCUMENTS

| 8,232,778 | B1* | 7/2012 | Patel | H02P 9/107 |
|---|---|---|---|---|
| | | | | 322/28 |
| 2004/0178759 | A1 | 9/2004 | Nakamura et al. | |
| 2009/0262468 | A1 | 10/2009 | Ide et al. | |
| 2011/0291634 | A1* | 12/2011 | Takata | H02M 1/32 |
| | | | | 323/285 |
| 2012/0063187 | A1 | 3/2012 | Sato et al. | |
| 2012/0146567 | A1* | 6/2012 | Iwaji | H02P 29/02 |
| | | | | 318/504 |
| 2012/0153719 | A1* | 6/2012 | Inaba | H02M 1/32 |
| | | | | 327/109 |

OTHER PUBLICATIONS

Eftichios Koutroulis, et al. "A system for inverter protection and real-time monitoring", Microelectronics Journal, vol. 34, No. 9, 2003, XP027113173, pp. 823-832.

\* cited by examiner

ELECTRIC POWER CONVERTER TO REDUCE OR ELIMINATE ERRONEOUS POWER MODULE ABNORMALITY INDICATION

INCORPORATION BY REFERENCE

The disclosure of Japanese Patent Application No. 2013-200348 filed on Sep. 26, 2013 including the specification, drawings and abstract, is incorporated herein by reference in its entirety.

BACKGROUND OF THE INVENTION

1. Field of the Invention

The invention relates to an electric power converter.

2. Description of the Related Art

There is a conventional electric power converter that includes: a power module including a plurality of power semiconductor devices such as insulated gate bipolar transistors (IGBTs); and a processor unit that controls the operation of the power module. Such an electric power converter is mounted in a vehicle such as an electric vehicle or a hybrid vehicle. The power module of the electric power converter converts direct-current power supplied from a driving electric power source into alternating-current power, and then supplies the alternating-current power to a motor (load).

Specifically, the power module includes: an inverter circuit in which multiple arms, each including power semiconductor devices connected in series, are connected in parallel; and a driver circuit that outputs, to each power semiconductor device, a drive signal (gate on-off signal), which is obtained by amplifying a control signal output from the processor unit based on a control voltage supplied from the outside. Each power semiconductor device is turned on or off based on the drive signal, and thus alternating-current power is supplied from the inverter circuit to the motor.

Recently, some electric power converters include, as a power module, a so-called intelligent power module (IPM) including an abnormality detection circuit that detects abnormalities such as overheating of power semiconductor devices, a short circuit in arms, and a drop in the control voltage supplied (applied) to a driver circuit (see, for example, Japanese Patent Application Publication No. 7-274485 (JP 7-274485 A)). When some sort of abnormality is detected by the abnormality detection circuit of the power module, a processor unit executes a failsafe process such as a process of stopping a motor.

Generally, such a power module is configured to output, for example, an abnormality detection signal (pulse) of which the level becomes instantaneously high when an abnormality is detected, and a latch circuit that latches the abnormality detection signal is disposed between the processor unit and the power module. The processor unit determines whether an abnormality is caused in the power module based on the voltage level of a latch signal output from the latch circuit.

However, with the conventional configuration described above, even when no abnormality is detected by the abnormality detection circuit, if a signal of which the level become instantaneously high is input into the latch circuit due to, for example, the influence of noise, the voltage level of a latch signal output from the latch circuit may be raised to the high level. Thus, there is a possibility that the processor unit will execute a failsafe process such as a process of stopping a motor in spite of the fact that the power module is operating properly.

This phenomenon may occur not only in the configuration in which an abnormality detection signal output from the abnormality detection circuit is input into the latch circuit, but also in the configuration in which an abnormality detection signal is directly input into the processor unit. For example, a failsafe process may be erroneously executed when a signal having the same voltage level as that when an abnormality is detected is erroneously input into the processor unit due to the influence of noise or the like.

SUMMARY OF THE INVENTION

One object of the invention is to provide an electric power converter configured to reduce the possibility that a processor unit will make an erroneous determination that an abnormality is caused in a power module.

An electric power converter according to an aspect of the invention includes:

a processor unit that outputs control signals; and a power module that converts direct-current power supplied from a driving electric power source, into alternating-current power based on the control signals.

The power module includes:

an inverter circuit in which multiple arms each having power semiconductor devices connected in series are connected in parallel;

a driver circuit that outputs drive signals obtained by amplifying the control signals based on a control voltage, to the power semiconductor devices; and an abnormality detection circuit that executes detection of at least one of abnormalities that are overheating of the power semiconductor devices, a short circuit in the arms, and a drop in the control voltage to be supplied to the driver circuit, and outputs an abnormality detection signal indicating a result of the abnormality detection to the processor unit.

The processor unit executes detection of a predicted state that is a stage prior to occurrence of at least one of the abnormalities.

When the predicted state is not detected, the processor unit makes a determination that the abnormality is not caused in the power module.

Before an abnormality is caused, the power module is placed in the predicted state that is a stage prior to occurrence of an abnormality. Thus, when the predicted state is not detected, it is estimated that a signal that indicates occurrence of an abnormality and that is input into the processor unit is due to the influence of, for example, noise. Thus, when the predicted state is not detected, a determination that an abnormality is not caused in the power module is made. In this way, it is possible to reduce the possibility that there is an abnormality in the power module.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
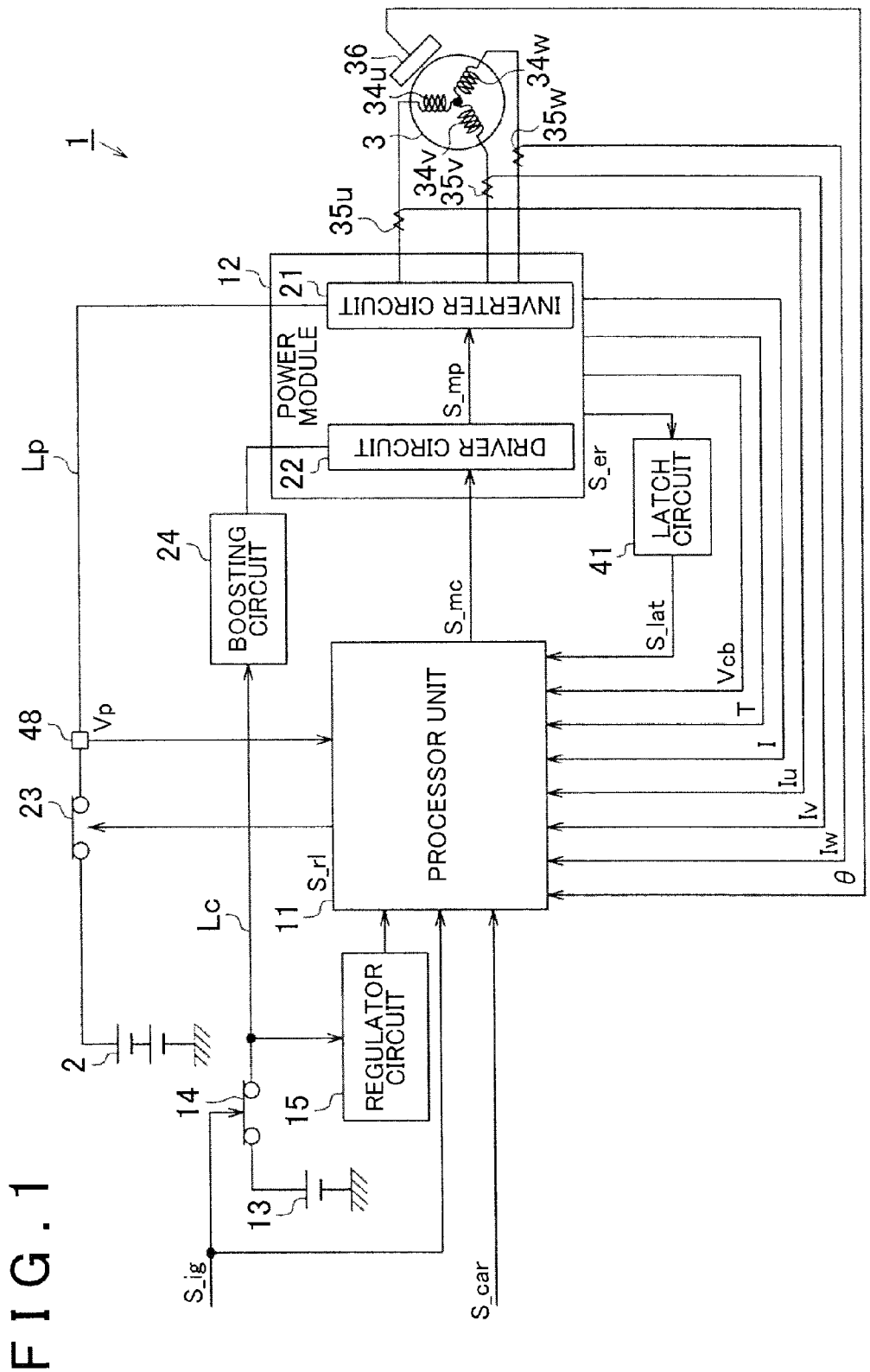
FIG. 1 is a block diagram illustrating an electric power converter and the configuration near the electric power converter.

Hereinafter, an electric power converter 1 according to an embodiment of the invention will be described with reference to the accompanying drawings. The electric power converter 1 illustrated in FIG. 1 is mounted in a vehicle such as an electric vehicle or a hybrid vehicle, and converts direct-current power supplied from a driving electric power source (driving battery) 2 into alternating-current power, and supplies the alternating-current power to a motor (load) 3 that serves as a source of power for propelling the vehicle. A driving electric power source with a rated voltage of, for example, 200V is used as the driving electric power source 2 in the present embodiment. A brushless motor that is operated by the received three-phase (U-phase, V-phase, W-phase) alternating-current power is adopted as the motor 3 in the present embodiment.

As illustrated in FIG. 1, the electric power converter 1 includes a processor unit 11 and a power module 12. The processor unit 11 outputs motor control signals S_mc that are control signals for controlling the operation of the motor 3. The power module 12 converts direct-current power supplied from the driving electric power source 2 into alternating-current power based on the motor control signals S_mc.

The processor unit 11 is connected to a control electric power source (control battery) 13 via an electric power supply line Lc. A control electric power source with a rated voltage of, for example 12V is used as the control electric power source 13 in the present embodiment. A control relay 14, which is a mechanical relay, and a regulator circuit 15, which generates a constant voltage, are disposed at an intermediate portion of the electric power supply line Lc. An IG signal S_ig indicating the state of an ignition switch (IG) of the vehicle is input into the control relay 14. When the IG signal S_ig indicating the on-state of the ignition switch is input into the control relay 14, the control relay 14 is placed in the on-state. When the IG signal S_ig indicating the off-state of the ignition switch is input into the control relay 14, the control relay 14 is placed in the off-state. The regulator circuit 15 generates a voltage to be supplied (applied) to the processor unit 11, based on an electric power supply voltage Vc supplied from the control electric power source 13. The voltage to be supplied to the processor unit 11 is, for example, 5V. When the control relay 14 is placed in the on-state and the electric power supply line Lc is brought into electrical conduction, the processor unit 11 operates upon reception of a constant voltage supplied from the regulator circuit 15 and the processor unit 11 outputs the motor control signals S_mc to the power module 12 based on a vehicle signal S_car as described later.

The power module 12 includes an inverter circuit 21 including a plurality of power semiconductor devices connected to each other, and a driver circuit 22 that outputs motor drive signals (gate on-off signals) S_mp to the inverter circuit 21. The power semiconductor devices are insulated gate bipolar transistors (IGBTs) 32a to 32f illustrated in FIG. 2. The driver circuit 22 amplifies the motor control signals S_mc to generate the motor drive signals S_mp, thereby driving the inverter circuit 21.

The inverter circuit 21 is connected to the driving electric power source 2 via an electric power supply line Lp, and the driver circuit 22 is connected to the control electric power source 13 via the electric power supply line Lc. A driving relay 23, which is a mechanical relay, is disposed at an intermediate portion of the electric power supply line Lp. When the driving relay 23 is placed in the on-state and the electric power supply line Lp is brought into electrical conduction, the inverter circuit 21 is allowed to supply the motor 3 with alternating-current power based on an electric power supply voltage Vp supplied from the driving electric power source 2. A boosting circuit 24 that boosts the electric power supply voltage Vc supplied from the control electric power source 13 is disposed at an intermediate portion of the electric power supply line Lc. The driver circuit 22 amplifies the motor control signals S_mc based on a control voltage Vcb (e.g., 15V) output from the boosting circuit 24, and outputs the amplified signals to the inverter circuit 21. As the power semiconductor devices are turned on or off based on the motor drive signals S_mp, the inverter circuit 21 outputs, to the motor 3, alternating-current power based on the electric power supply voltage Vp supplied from the driving electric power source 2.

Figure 2:
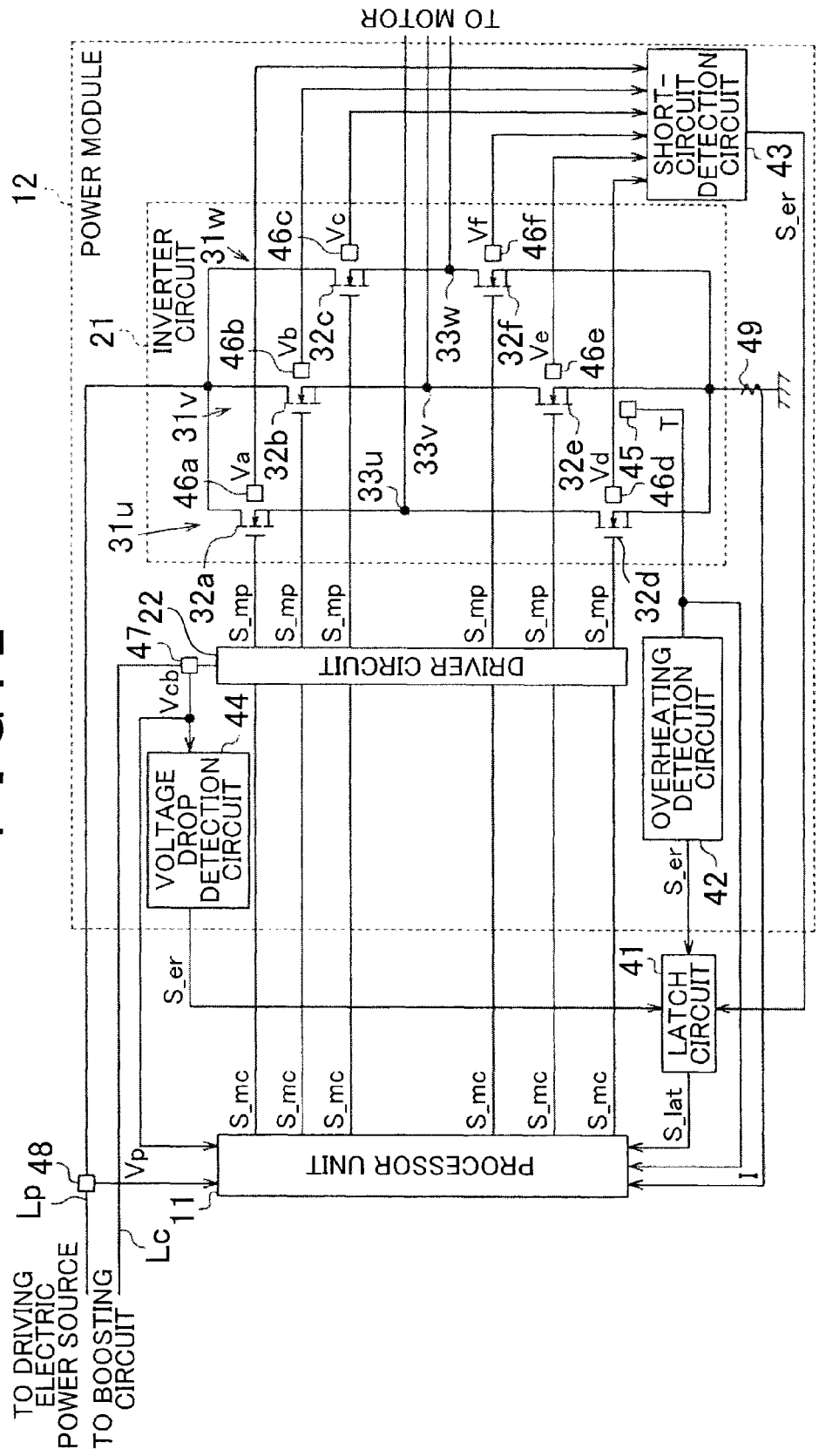
FIG. 2 is a block diagram of a power module.

The details of the power module 12 are illustrated in FIG. 2. The inverter circuit 21 is a PWM inverter in which arms (switching arms) 31u, 31v, 31w are connected in parallel so as to correspond respectively to the three phases of the motor. Specifically, the arms 31u, 31v, 31w are respectively formed by connecting the IGBT 32a and the IGBT 32d in series, connecting the IGBT 32b and the IGBT 32e in series, and connecting the IGBT 32c and the IGBT 32f in series. Connection points 33u, 33v, 33w, which are respectively located between the IGBT 32a and the IGBT 32d, between the IGBT 32b and the IGBT 32e, and between the IGBT 32c and the IGBT 32f, are connected to three-phase motor coils 34u, 34v, 34w (see FIG. 1). Each of the IGBTs 32a to 32f is provided with a diode (not illustrated) that allows electrical conduction from the emitter side to the collector side.

The driver circuit 22 includes, for example, a plurality of operational amplifiers (not illustrated) corresponding to the IGBTs 32a to 32f, and the motor control signals S_mc are input into the operational amplifiers from the processor unit 11. The motor control signals S_mc are input into input terminals of the operational amplifiers via photocouplers (not illustrated), and the processor unit 11 and the power module 12 are electrically insulated from each other. The control voltage Vcb boosted by the boosting circuit 24 is supplied (applied) to the driver circuit 22. The driver circuit 22 amplifies the received motor control signals S_mc based on the supplied control voltage Vcb, thereby outputting the motor drive signals S_mp to the gate terminals of the IGBTs 32a to 32f. Thus, in the inverter circuit 21, the IGBTs 32a to 32f are turned on or off in response to the three-phase motor drive signals S_mp, and the patterns of electrical conduction to the three-phase motor coils 34u, 34v, 34w are switched. As a result, three-phase alternating-current power is supplied to the motor 3.

As illustrated in FIG. 1, the processor unit 11 receives the vehicle signal S_car indicating, for example, an accelerator pedal depression amount that indicates a depressed amount of an accelerator pedal (not illustrated) of the vehicle or a vehicle speed. The processor unit 11 computes a target torque for the motor 3 based on the vehicle signal S_car, and outputs the motor control signals S_mc for controlling the motor 3 such that the target torque is generated. The processor unit 11 in the present embodiment receives three-phase currents Iu, Iv, Iw for the motor 3, which are detected by three-phase current sensors 35u, 35v, 35w, and a rotation angle θ of the motor 3, which is detected by a resolver 36. The processor unit 11 executes current feedback control such that the three-phase currents Iu, Iv, Iw follow three-phase current command values corresponding to the torque to be generated by the motor 3, thereby outputting the motor control signals S_mc.

Figure 3:
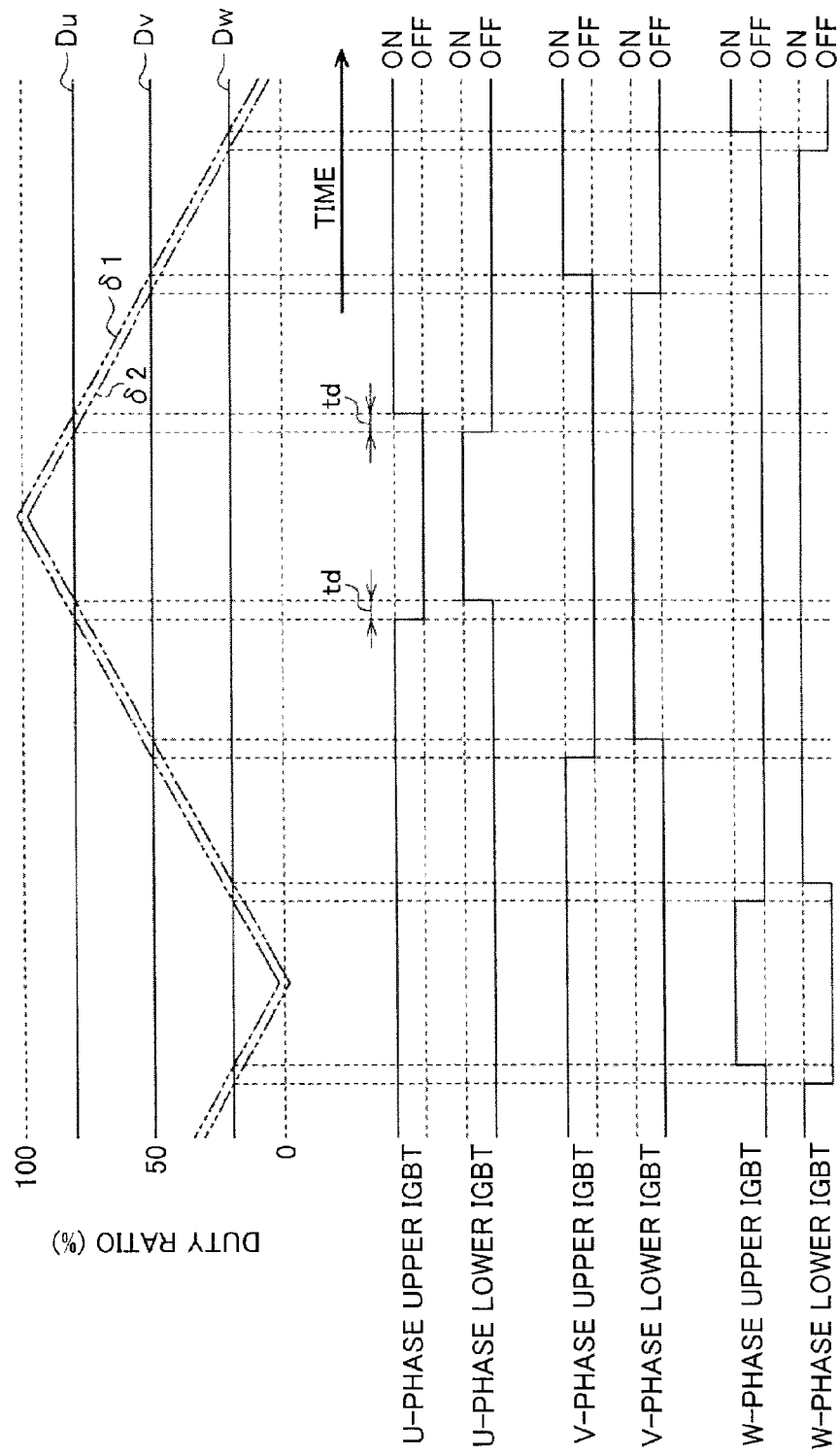
FIG. 3 illustrates time charts, wherein the upper half of FIG. 3 illustrates time charts indicating transitions of duty command values and triangular waves, and the lower half of FIG. 3 illustrates time charts indicating transitions of the on-off-states of IGBTs.

Each motor control signal S_mc in the present embodiment is a pulse signal subject to pulse width modulation (PWM) control. Specifically, as illustrated in FIG. 3, the processor unit 11 generates the motor control signals S_mc to be output to the power module 12, based on the comparison between three-phase duty command values Du, Dv, Dw corresponding to the three-phase current command values computed through execution of the current feedback control and triangular waves that are PWM carriers (carrier waves). The processor unit 11 uses two triangular waves δ1, δ2 shifted from each other in the up-down direction in FIG. 3 and having the same phase (the duty ratio based on the triangular wave δ1>the duty ratio based on the triangular wave δ2), and thus sets dead times td during which the IGBTs 32a to 32c on the high potential side (upper side) in the arms 31u, 31v, 31w and the IGBTs 32d to 32f on the low potential side (lower side) in the arms 31u, 31v, 31w are both maintained in the off-state. Specifically, in each dead time td, the IGBTs 32a, 32d of the arm 31u, or the IGBTs 32b, 32e of the arm 31v, or the IGBTs 32c, 32f of the arm 31w are respectively maintained in the off-state.

Specifically, the processor unit 11 generates the motor control signals S_mc such that, when each of the three-phase duty command values Du, Dv, Dw is higher than the value of the triangular wave δ1, which is set above the triangular wave δ2 in FIG. 3, a corresponding one of the three-phase upper IGBTs 32a to 32c is maintained in the on-state, whereas when each of the three-phase duty command values Du, Dv, Dw is lower than the value of the triangular wave δ1, a corresponding one of the three-phase upper IGBTs 32a to 32c is maintained in the off-state. Similarly, the processor unit 11 generates the motor control signals S_mc such that, when each of the three-phase duty command values Du, Dv, Dw is lower than the value of the triangular wave δ2, which is set below the triangular wave δ1 in FIG. 3, a corresponding one of the three-phase lower IGBTs 32d to 32f is maintained in the on-state, whereas when each of the three-phase duty command values Du, Dv, Dw is higher than the value of the triangular wave δ2, a corresponding one of the three-phase lower IGBTs 32d to 32f is maintained in the off-state.

As illustrated in FIG. 1, the IG signal S_ig is input into the processor unit 11. When the processor unit 11 receives the IG signal S_ig indicating the on-state of the ignition switch, the processor unit 11 outputs the relay control signal S_rl for placing the driving relay 23 in the on-state. When the processor unit 11 receives the IG signal S_ig indicating the off-state of the ignition switch, the processor unit 11 outputs the relay control signal S_rl for placing the driving relay 23 in the off-state.

As illustrated in FIG. 2, the power module 12 is configured as a so-called intelligent power module (IPM) that detects abnormalities such as overheating of the IGBTs 32a to 32f, a short circuit in the arms 31u, 31v, 31w, and a drop in the control voltage Vcb. A latch circuit 41 that latches (holds a state of) an abnormality detection signal S_er output from the power module 12 is disposed between the processor unit 11 and the power module 12. The processor unit 11 determines whether an abnormality is caused in the power module 12 based on the voltage level of a latch signal S_lat. When it is determined that an abnormality is caused, the processor unit 11 executes a failsafe process of stopping the motor 3 by stopping the power module 12.

Specifically, the power module 12 includes an overheating detection circuit 42 that detects overheating of the IGBTs 32a to 32f, a short-circuit detection circuit 43 that detects a short circuit in the arms 31u, 31v, 31w, and a voltage drop detection circuit 44 that detects a drop in the control voltage Vcb. That is, in the present embodiment, each of the overheating detection circuit 42, the short-circuit detection circuit 43 and the voltage drop detection circuit 44 may function as an abnormality detection circuit.

A temperature sensor 45 disposed near the IGBT 32e is connected to the overheating detection circuit 42. The overheating detection circuit 42 executes a comparison in magnitude between a detected temperature T detected by the temperature sensor 45 and a temperature abnormality determination threshold Tth_er that is set in advance. When the detected temperature T is equal to or lower than the temperature abnormality determination threshold Tth_er, the overheating detection circuit 42 determines that the IGBTs 32a to 32f are not overheated, and outputs a low-level abnormality detection signal S_er. On the other hand, when the detected temperature T is higher than the temperature abnormality determination threshold Tth_er, the overheating detection circuit determines that the IGBTs 32a to 32f are overheated, and outputs an abnormality detection signal S_er of which the level becomes instantaneously high, that is, a pulse signal.

Voltage sensors 46a to 46f that respectively detect inter-terminal voltages Va to Vf between collector terminals and emitter terminals of the three-phase IGBTs 32a to 32f are connected to the short-circuit detection circuit 43. The short-circuit detection circuit 43 executes a comparison in magnitude between (the absolute values of) the inter-terminal voltages Va to Vf detected by the voltage sensors 46a to 46f and an inter-terminal voltage abnormality determination threshold Vxth_er. The inter-terminal voltage abnormality determination threshold Vxth_er is a voltage that is generated between the collector terminal and the emitter terminal when each of the IGBTs 32a to 32f is stuck in the on-state due to a malfunction, and is obtained by, for example, an experiment in advance. When each of all the inter-terminal voltages Va to Vf is equal to or lower than the inter-terminal voltage abnormality determination threshold Vxth_er, the short-circuit detection circuit 43 determines that no short circuit occurs in the arms 31u, 31v, 31w, and outputs a low-level abnormality detection signal S_er. On the other hand, when at least one of the inter-terminal voltages Va to Vf is higher than the inter-terminal voltage abnormality determination threshold Vxth_er, the short-circuit detection circuit 43 determines that a short circuit occurs in the arms 31u, 31v, 31w, and outputs a pulsed abnormality detection signal S_er of which the level becomes instantaneously high.

A voltage sensor 47 that detects the control voltage Vcb to be supplied to the driver circuit 22 is connected to the voltage drop detection circuit 44. The voltage drop detection circuit 44 executes a comparison in magnitude between the absolute value of the control voltage Vcb detected by the voltage sensor 47 and a control voltage abnormality determination threshold Vcbth_er that is set in advance. When the control voltage Vcb is higher than the control voltage abnormality determination threshold Vcbth_er, the voltage drop detection circuit 44 determines that there is no drop in the control voltage Vcb, and outputs a low-level abnormality detection signal S_er. On the other hand, when the control voltage Vcb is equal to or lower than the control voltage abnormality determination threshold Vcbth_er, the voltage drop detection circuit 44 determines that the control voltage Vcb drops, and outputs a pulsed abnormality detection signal S_er of which the level becomes instantaneously high.

When the latch circuit 41 receives a pulsed abnormality detection signal S_er of which the level becomes instantaneously high from at least one of the overheating detection circuit 42, the short-circuit detection circuit 43 and the voltage drop detection circuit 44, the latch circuit 41 switches the voltage level of the latch signal S_lat from the low level to the high level and maintains the voltage level of the latch signal S_lat at the high level. When the processor unit 11 receives a high-level latch signal S_lat from the latch circuit 41, the processor unit 11 executes a shutdown process of, for example, outputting a relay control signal S_rl for placing the driving relay 23 in the off-state, or stopping output of the motor control signals S_mc, and thus stops the motor 3 by stopping the power module 12.

Even when none of the short-circuit detection circuit 43, the overheating detection circuit 42 and the voltage drop detection circuit 44 detects an abnormality, if a signal of which the level become instantaneously high is input into the latch circuit 41 due to, for example, the influence of noise, the voltage level of the latch signal S_lat may be raised to the high level.

On the basis of this fact, the processor unit 11 executes detection of an overheating predicted state that is a stage prior to overheating of the IGBTs 32a to 32f, a short circuit predicted state that is a stage prior to a short circuit in the arms 31u, 31v, 31w, and a voltage drop predicted state that is a stage prior to a drop in the control voltage Vcb. When none of these predicted states is detected, a determination that an abnormality is caused is not made even if the voltage level of the latch signal S_lat is switched to the high level. When the overheating predicted state is detected, the processor unit 11 makes the duty ratio of each motor control signal S_mc lower than that when the overheating predicted state is not detected. When the short-circuit predicted state is detected, the processor unit 11 makes the dead time td longer than that when the short-circuit predicted state is not detected. When the voltage drop predicted state is detected, the processor unit 11 stops the power module 12 by executing the shutdown process.

Specifically, the temperature sensor 45 is connected to the processor unit 11. The processor unit 11 executes detection of the overheating predicted state based on a comparison in magnitude between the detected temperature T detected by the temperature sensor 45 and a temperature prediction value Tth_pr. The temperature prediction value Tth_pr is set to a value lower than the temperature abnormality determination threshold Tth_er. When the detected temperature T is higher than the temperature prediction value Tth_pr, the processor unit 11 determines that the power module 12 is in the overheating predicted state. When the overheating predicted state is detected, the processor unit 11 sets an upper limit that is smaller than 100%, for the duty command values Du, Dv, Dw, and thus imposes a limitation so that the duty ratio of each motor control signal S_mc is lowered. That is, when the three-phase duty command values Du, Dv, Dw exceed the upper limit, the processor unit 11 outputs such motor control signals S_mc that the IGBTs 32a to 32f are turned on and off based on the duty ratio indicated by the upper limit.

In addition, a voltage sensor 48 that detects the electric power supply voltage Vp supplied from the driving electric power source 2 and a current sensor 49 that detects a driving current I flowing through the inverter circuit 21 (electric current to be applied to the motor 3) are connected to the processor unit 11. The processor unit 11 executes detection of the short-circuit predicted state based on a comparison in magnitude between (the absolute value of) the electric power supply voltage Vp supplied from the driving electric power source 2, which is detected by the voltage sensor 48, and an electric power supply voltage prediction value Vpth_pr, and based on a comparison in magnitude between (the absolute value of) the driving current I, which is detected by the current sensor 49, and a driving current prediction value Ith_pr. The electric power supply voltage prediction value Vpth_pr is set to a value lower than an electric power supply voltage abnormality determination threshold Vpth_er indicating that a short circuit occurs in any one of the arms 31u, 31v, 31w. The driving current prediction value Ith_pr is set to a value lower than a driving current abnormality determination threshold Ith_er indicating that a short circuit occurs in any one of the arms 31u, 31v, 31w. When the electric power supply voltage Vp supplied from the driving electric power source 2 is equal to or lower than the electric power supply voltage prediction value Vpth_pr and the driving current I is higher than the driving current prediction value Ith_pr, the processor unit 11 determines that the power module 12 is in the short-circuit predicted state. When the short-circuit predicted state is detected, the processor unit 11 increases the difference between the triangular wave δ1 and the triangular wave δ2, and thus makes the dead time td longer.

The voltage sensor 47 that detects the above control voltage Vcb is connected to the processor unit 11. The processor unit 11 executes a comparison in magnitude between the control voltage Vcb and a control voltage prediction value Vcbth_pr. The control voltage prediction value Vcbth_pr is set to a value that is higher than the control voltage abnormality determination threshold Vcbth_er. When the control voltage Vcb is equal to or lower than the control voltage prediction value Vcbth_pr, the processor unit 11 determines that the power module 12 is in the voltage drop predicted state. When the voltage drop predicted state is detected, the processor unit 11 stops the power module 12 by executing the shutdown process, and thus stops the motor 3.

When none of these predicted states is detected, even if a high-level latch signal S_lat is input into the latch circuit 41, the processor unit 11 invalidates the high-level latch signal S_lat and does not stop the motor 3. Further, the processor unit 11 in the present embodiment returns the voltage level of the latch signal S_lat, which is output from the latch circuit 41, to the low level. On the other hand, the processor unit 11 validates a high-level latch signal S_lat, which is input into the latch circuit 41 after the overheating predicted state or the short-circuit predicted state is detected, and stops the motor 3.

Figure 4:
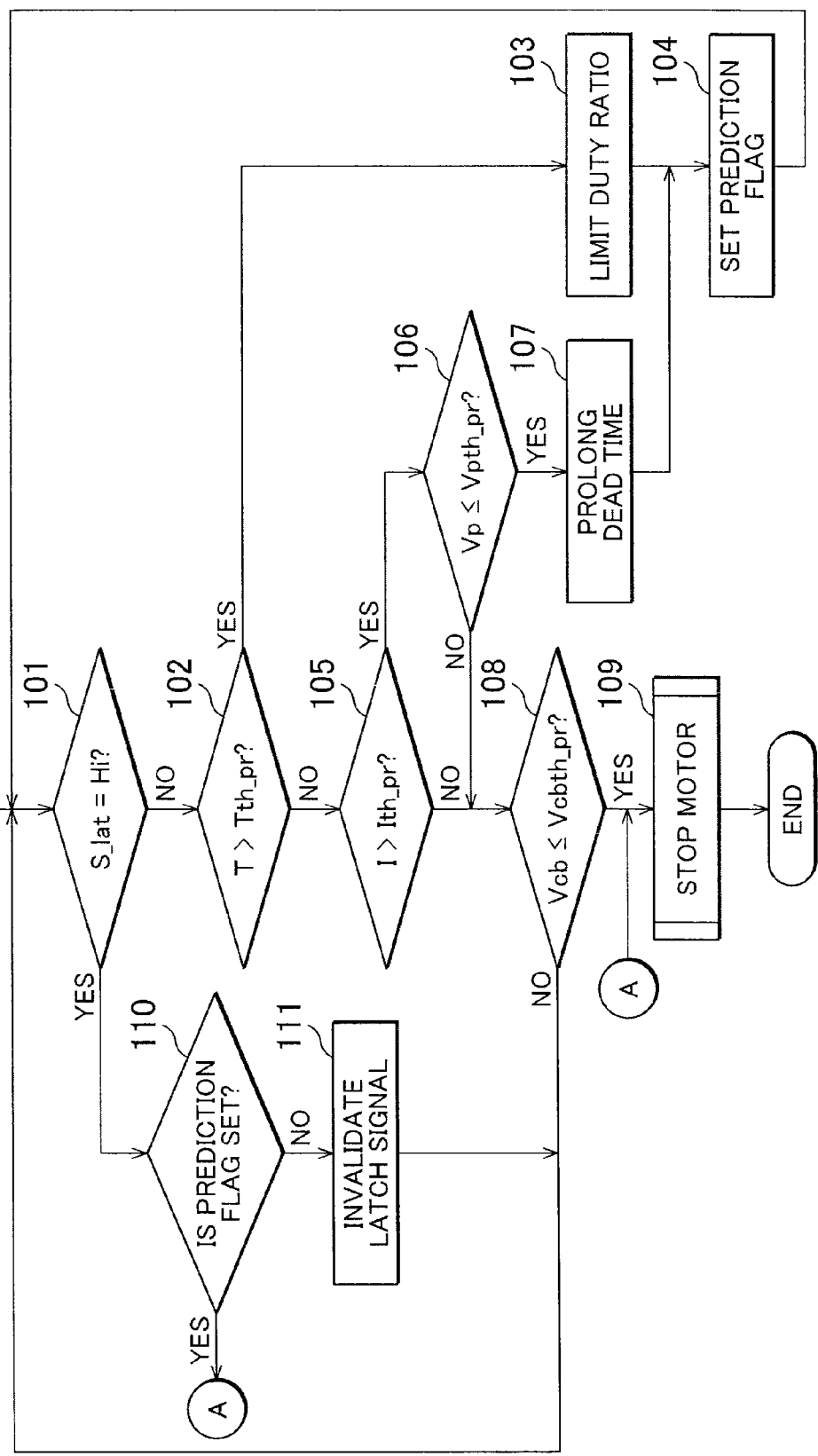
FIG. 4 is a flowchart illustrating a procedure of abnormality detection executed by a processor unit.

Next, a procedure of abnormality detection executed by the processor unit 11 in the present embodiment will be described. As illustrated in a flowchart in FIG. 4, the processor unit 11 first determines whether the latch signal S_lat is at the high level or not (step 101). When the latch signal S_lat is at the low level (step 101: NO), the processor unit 11 determines whether the detected temperature T is higher than the temperature prediction value Tth_pr (step 102). When the detected temperature T is higher than the temperature prediction value Tth_pr (step 102: YES), the processor unit 11 determines that the power module 12 is in the overheating predicted state, and imposes a limitation so that the duty ratio of each motor control signal S_mc is lowered (step 103). Then, the processor unit 11 sets a prediction flag indicating that the power module 12 is in the overheating predicted state or the short-circuit predicted state (step 104), and proceeds on to step 101 to determine whether the latch signal S_lat is at the high level.

When the detected temperature T is equal to or lower than the temperature prediction value Tth_pr (step 102: NO), the processor unit 11 determines whether the driving current I is higher than the driving current prediction value Ith_pr (step 105). When the driving current I is higher than the driving current prediction value Ith_pr (step 105: YES), the processor unit 11 determines whether the electric power supply voltage Vp supplied from the driving electric power source 2 is equal to or lower than the electric power supply voltage prediction value Vpth_pr (step 106). When the electric power supply voltage Vp supplied from the driving electric power source 2 is equal to or lower than the electric power supply voltage prediction value Vpth_pr (step 106: YES), the processor unit 11 prolongs each of the dead times td, during which the IGBTs 32*a* to 32*c* on the high potential side (upper side) and the IGBTs 32*d* to 32*f* on the low potential side (lower side) are both maintained in the off-state (step 107). Then, the processor unit 11 proceeds on to step 104 to set the prediction flag, and the proceeds on to step 101 to determine whether the latch signal S_lat is at the high level.

When the driving current I is equal to or lower than the driving current prediction value Ith_pr (step 105: NO), or the electric power supply voltage Vp supplied from the driving electric power source 2 is higher than the electric power supply voltage prediction value Vpth_pr (step 106: NO), the processor unit 11 determines whether the control voltage Vcb to be supplied to the driver circuit 22 is equal to or lower than the control voltage prediction value Vcbth_pr (step 108). When the control voltage Vcb is equal to or lower than the control voltage prediction value Vcbth_pr (step 108: YES), the processor unit 11 determines that the power module 12 is in the voltage drop predicted state, and stops the power module 12 by executing the shutdown process, and thus stops the motor 3 (step 109). When the control voltage Vcb is higher than the control voltage prediction value Vcbth_pr (step 108: NO), the processor unit 11 determines that none of the predicted states occurs, and proceeds on to step 101 without setting the prediction flag, to determine whether the latch signal S_lat is at the high level.

On the other hand, when the latch signal S_lat is at the high level (step 101: YES), the processor unit 11 determines whether the prediction flag is set or not (step 110). When the prediction flag is set (step 110: YES), the processor unit 11 proceeds on to step 109 to stop the motor 3. On the other hand, when the prediction flag is not set (step 110: NO), the processor unit 11 determines that the voltage level of the latch signal S_lat is raised to the high level due to, for example, the influence of noise, and invalidates the latch signal S_lat and returns the voltage level of the latch signal S_lat to the low level (step 111). Then, the processor unit 11 proceeds on to step 101 to determine whether the latch signal S_lat is at the high level.

Next, the operations of the present embodiment will be described. When none of the overheating predicted state, the short-circuit predicted state and the voltage drop predicted state is detected, it is estimated that a high-level latch signal S_lat input into the processor unit 11 is due to, for example, the influence of noise, and thus the processor unit 11 makes a determination that an abnormality is not caused in the power module 12. Therefore, even when the voltage level of the latch signal S_lat erroneously becomes the high level due to, for example, the influence of noise, the motor 3 is not stopped and the vehicle is able to continue to travel using the motor 3. When the overheating predicted state is detected by the processor unit 11, the duty ratio of each motor control signal S_mc is limited. Thus, the time during which each of the IGBTs 32*a* to 32*f* is maintained in the on-state, that is, the time during which electric current is applied to each of the IGBTs 32*a* to 32*f* is shortened, and heating thereof is suppressed. When the short circuit predicted state of the arms 31*u*, 31*v*, 31*w* is detected by the processor unit 11, the dead time td is prolonged, and thus an instantaneous short circuit caused by a time delay of switchover between the on-state and the off-state of the IGBTs 32*a* to 32*f* is less likely to occur.

Next, the advantageous effects of the present embodiment will be described.

1) The processor unit 11 executes detection of the overheating predicted state, the short-circuit predicted state and the voltage drop predicted state. When none of these predicted states is detected, the processor unit 11 makes a determination that an abnormality is not caused in the power module 12. Thus, it is possible to reduce the possibility that an erroneous determination that an abnormality is caused in the power module 12 will be made.

2) When the overheating predicted state is detected, the processor unit 11 limits the upper limit of the duty ratio of each motor control signal S_mc. Thus, it is possible to suppress heating of the IGBTs 32*a* to 32*f*. As a result, it is possible to avoid the occurrence of a situation where overheating of the inverter circuit 21 is detected by the overheating detection circuit 42 and thus the motor 3 is required to be stopped.

3) When the short circuit predicted state of the arms 31*u*, 31*v*, 31*w* is detected, the processor unit 11 prolongs the dead time td, and thus an instantaneous short circuit caused by a time delay of switchover between the on-state and the off-state of the IGBTs 32*a* to 32*f* is less likely to occur. As a result, it is possible to avoid the occurrence of a situation where a short circuit in the arms 31*u*, 31*v*, 31*w* is detected by the short-circuit detection circuit 43 and thus the motor 3 is required to be stopped.

4) When the voltage drop predicted state of the control voltage Vcb is detected, the processor unit 11 stops the power module 12. Thus, a failsafe process is promptly executed before the possibility that the inverter circuit 21 will fail to properly operate due to a drop in the control voltage Vcb is raised.

The above-described embodiment may be modified as follows. In the above-described embodiment, as the control voltage Vcb supplied to the driver circuit 22, the control voltage Vcb obtained by boosting the electric power supply voltage Vc supplied from the control electric power source 13 using the boosting circuit 24 is supplied to the driver circuit 22. However, for example, the electric power supply voltage Vc supplied from the control electric power source 13 may be supplied to the driver circuit 22 as it is.

In the above-described embodiment, the short-circuit detection circuit 43 executes detection of a short circuit in the arms 31*u*, 31*v*, 31*w* based on a comparison in magnitude between each of the inter-terminal voltages Va to Vf and the inter-terminal voltage abnormality determination threshold Vxth_er. However, the short-circuit detection circuit 43 executes detection of a short circuit in the arms 31*u*, 31*v*, 31*w* based on a comparison in magnitude between, for example, the driving current I flowing through the inverter circuit 21 and the driving current abnormality determination threshold Ith_er.

In the above-described embodiment, the overheating predicted state is detected based on the detected temperature T detected by the temperature sensor 45 of the power module 12. However, a temperature sensor different from the temperature sensor 45 of the power module 12 may be provided to detect the overheating predicted state based on the temperature detected by this temperature sensor. Similarly, a voltage sensor that differs from the voltage sensor 47 of the power module 12 and that detects the control voltage Vcb may be provided to detect the voltage drop predicted state based on the control voltage detected by this voltage sensor.

In the above-described embodiment, the short-circuit predicted state is detected based on the driving current I detected by the current sensor 49. However, the driving current may be estimated based on, for example, the three-phase currents Iu, Iv, Iw respectively detected by the phase current sensors 35*u*, 35*v*, 35*w*, and the short-circuit predicted state may be detected based on the estimated values.

In the above-described embodiment, when both a) the condition that the electric power supply voltage Vp supplied from the driving electric power source 2 is higher than the electric power supply voltage prediction value Vpth_pr, and b) the condition that the driving current I is higher than the driving current prediction value Ith_pr are satisfied, it is determined that the power module 12 is in the short-circuit predicted state. However, when one of the condition a) and the condition b) is satisfied, it may be determined that the power module 12 is in the short-circuit predicted state.

In the above-described embodiment, the short-circuit predicted state may be detected based on only a comparison in magnitude between the electric power supply voltage Vp supplied from the driving electric power source 2 detected by the voltage sensor 48 and the electric power supply voltage prediction value Vpth_pr, or only a comparison in magnitude between the driving current I detected by the current sensor 49 and the driving current prediction value Ith_pr.

In the above-described embodiment, detection of the overheating predicted state, detection of the short-circuit predicted state, and detection of the voltage drop predicted state are executed in the stated order. However, the order of executing these detection may be changed as needed. In the above-described embodiment, when the overheating predicted state is detected, the upper limit of the duty ratio of each motor control signal S_mc is limited to make the duty ratio of the motor control signal S_mc lower than that in the normal state. However, for example, each of the computed duty command values Du, Dv, Dw may be multiplied by a coefficient that is equal to or larger than zero and smaller than one to make the duty ratio of each motor control signal S_mc lower than that in the normal state.

In the above-described embodiment, even when the overheating predicted state is detected, the duty ratio of the motor control signal S_mc need not be made lower than that in the normal state. In the above-described embodiment, even when the short circuit predicted state of the arms 31*u*, 31*v*, 31*w* is detected, the dead time td need not be prolonged.

In the above-described embodiment, when the voltage drop predicted state is detected, instead of a failsafe process of stopping the power module 12 to stop the motor 3, another process may be executed.

In the above-described embodiment, the power module 12 executes detections of three kinds of abnormalities, that is, overheating of the IGBTs 32*a* to 32*f*, a short circuit in the arms 31*u*, 31*v*, 31*w*, and a voltage drop of the control electric power source 13. However, the power module 12 may execute detection of at least one of the three kinds of abnormalities. For example, overheating of the IGBTs 32*a* to 32*f* need not be detected. In this case, the processor unit 11 detects only a predicted state corresponding to the abnormality detection executed by the power module 12.

In the above-described embodiment, the abnormality detection signal S_er output from the power module 12 is input into the processor unit 11 via the latch circuit 41. However, the abnormality detection signal S_er may be input directly into the processor unit 11.

In the above-described embodiment, the inverter circuit 21 is formed of the IGBTs 32*a* to 32*f*. However, the inverter circuit 21 may be formed of, for example, other power semiconductor devices such as field effect transistors (FETs).

In the above-described embodiment, the electric power converter 1 supplies alternating-current power to the motor 3 for propelling the vehicle, which is mounted in the vehicle. However, the electric power converter 1 may supply alternating-current power to a motor for other uses or a load other than a motor.

What is claimed is:

1. An electric power converter comprising:
a processor that outputs control signals; and
a power module that converts direct-current power supplied from a driving electric power source, into alternating-current power based on the control signals,
the power module including:
an inverter circuit in which multiple arms each having power semiconductor devices connected in series are connected in parallel,
a driver circuit that outputs drive signals obtained by amplifying the control signals based on a control voltage, to the power semiconductor devices, and
an abnormality detection circuit that executes detection of at least one of a plurality of abnormalities including overheating of the power semiconductor devices, a short circuit in the arms, and a drop in the control voltage to be supplied to the driver circuit, and that outputs an abnormality detection signal indicating a result of the abnormality detection to the processor, wherein
the processor executes detection of a predicted state that is a state prior to occurrence of the at least one of the plurality of abnormalities, and
the processor makes a determination that the at least one of the plurality of abnormalities is not caused in the power module when the predicted state is not detected, even if the at least one of the plurality of abnormalities is detected.

2. The electric power converter according to claim 1, wherein, when the predicted state in the form of overheating of the power semiconductor devices is detected, the processor makes a duty of each of the control signals lower than when the predicted state of overheating of the power semiconductor devices is not detected.

3. The electric power converter according to claim 2, wherein, when the predicted state in the form of a short circuit in the arms is detected, the processor makes a dead time during which both a power semiconductor device on a high potential side and a power semiconductor device on a low potential side of said power semiconductor devices are maintained in an off-state, longer than when the predicted state of the short circuit in the arms is not detected.

4. The electric power converter according to claim 1, wherein, when the predicted state in the form of a short circuit in the arms is detected, the processor makes a dead time during which both a power semiconductor device on a high potential side and a power semiconductor device on low potential side of said power semiconductor devices are maintained in an off-state, longer than when the predicted state of the short circuit in the arms is not detected.

5. The electric power converter according to claim 1, wherein, when the predicted state in the form of a drop in the control voltage is detected, the processor stops the power module.

6. The electric power converter according to claim 1, wherein
the abnormality detection circuit executes the detection of overheating of the power semiconductor devices based on a comparison in magnitude between each of detected temperatures of the power semiconductor devices detected by a temperature sensor and a temperature abnormality determination threshold; and the processor executes detection of the predicted state in the form of overheating of the power semiconductor devices based on a comparison in magnitude between each of the detected temperatures and a temperature prediction value indicating a temperature lower than the temperature abnormality determination threshold.

7. The electric power converter according to claim 1, wherein the abnormality detection circuit executes the detection of a short circuit in the arms based on a comparison in magnitude between an inter-terminal voltage of each of the power semiconductor devices and an inter-terminal voltage abnormality determination threshold; and the processor executes detection of the predicted state in the form of a short circuit in the arms based on a comparison in magnitude between an electric power supply voltage supplied from the driving electric power source and an electric power supply voltage prediction value that is lower than an electric power supply voltage abnormality determination threshold indicating that a short circuit occurs in the arms.

8. The electric power converter according to claim 1, wherein the abnormality detection circuit executes the detection of a short circuit in the arms based on a comparison in magnitude between an inter-terminal voltage of each of the power semiconductor devices and an inter-terminal voltage abnormality determination threshold; and the processor executes detection of the predicted state in the form of a short circuit in the arms based on a comparison in magnitude between a driving current flowing through the inverter circuit and a driving current prediction value that is lower than a driving current abnormality determination threshold indicating that a short circuit occurs in the arms.

9. The electric power converter according to claim 7, wherein the abnormality detection circuit executes the detection of a short circuit in the arms based on a comparison in magnitude between an inter-terminal voltage of each of the power semiconductor devices and an inter-terminal voltage abnormality determination threshold; and the processor executes detection of the predicted state in the form of a short circuit in the arms based on a comparison in magnitude between a driving current flowing through the inverter circuit and a driving current prediction value that is lower than a driving current abnormality determination threshold indicating that a short circuit occurs in the arms.

10. The electric power converter according to claim 1, wherein the abnormality detection circuit executes the detection of a drop in the control voltage based on a comparison in magnitude between the control voltage to be supplied to the driver circuit and a control voltage abnormality determination threshold; and the processor executes detection of the predicted state in the form of a drop in the control voltage based on a comparison in magnitude between the control voltage to be supplied to the driver circuit and a control voltage prediction value that is lower than the control voltage abnormality determination threshold.

* * * * *